(12) United States Patent
Bartik et al.

(10) Patent No.: US 10,496,405 B2
(45) Date of Patent: *Dec. 3, 2019

(54) GENERATING AND VERIFYING HARDWARE INSTRUCTION TRACES INCLUDING MEMORY DATA CONTENTS

(71) Applicant: INTERNATIONAL BUSINESS MACHINES CORPORATION, Armonk, NY (US)

(72) Inventors: Jane H. Bartik, Poughkeepsie, NY (US); Christian Jacobi, West Park, NY (US); David Lee, Poughkeepsie, NY (US); Jang-Soo Lee, Poughkeepsie, NY (US); Anthony Saporito, Highland, NY (US); Christian Zoellin, Weinstadt (DE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 60 days.

This patent is subject to a terminal disclaimer.

(21) Appl. No.: 15/817,622

(22) Filed: Nov. 20, 2017

(65) Prior Publication Data

US 2018/0341481 A1 Nov. 29, 2018

Related U.S. Application Data

(63) Continuation of application No. 15/602,618, filed on May 23, 2017, now Pat. No. 10,331,446.

(51) Int. Cl.
*G06F 9/30* (2018.01)
*G06F 9/38* (2018.01)
*G06F 11/36* (2006.01)

(52) U.S. Cl.
CPC ........ *G06F 9/3004* (2013.01); *G06F 9/30101* (2013.01); *G06F 9/3867* (2013.01); *G06F 11/36* (2013.01); *G06F 11/3636* (2013.01)

(58) Field of Classification Search
None
See application file for complete search history.

(56) References Cited

U.S. PATENT DOCUMENTS 6,173,395 B1 * 1/2001 Wisor ................. G06F 11/3636
712/227
6,282,629 B1 * 8/2001 Sager .................... G06F 9/3836
712/23

(Continued)

FOREIGN PATENT DOCUMENTS

CN 102789401 A 11/2018
EP 1039377 B1 9/2006

OTHER PUBLICATIONS

Jane H. Bartik et al."Generating and Verifying Hardware Instruction Traces Including Memory Data Contents", U.S. Appl. No. 15/602,618, filed May 23, 2017.

(Continued)

*Primary Examiner* — Eric Coleman
(74) *Attorney, Agent, or Firm* — Cantor Colburn LLP; William Kinnaman

(57) ABSTRACT

Embodiments of the present invention are directed to a computer-implemented method for generating and verifying hardware instruction traces including memory data contents. The method includes initiating an in-memory trace (IMT) data capture for a processor, the IMT data being an instruction trace collected while instructions flow through an execution pipeline of the processor. The method further includes capturing contents of architected registers of the processor by: storing the contents of the architected registers (Continued)

to a predetermined memory location, and causing a load-store unit (LSU) to read contents of the predetermined memory location.

12 Claims, 13 Drawing Sheets

(56) References Cited

U.S. PATENT DOCUMENTS

| | | | | |
|---|---|---|---|---|
| 7,043,668 | B1* | 5/2006 | Treue | G06F 11/3636 |
| | | | | 712/227 |
| 7,747,989 | B1* | 6/2010 | Kissell | G06F 9/45516 |
| | | | | 717/148 |
| 7,987,342 | B1* | 7/2011 | Thaik | G06F 9/3017 |
| | | | | 712/208 |
| 8,527,959 | B2 | 9/2013 | Chung et al. | |
| 9,124,481 | B2 | 9/2015 | Mann et al. | |
| 2003/0135719 | A1 | 7/2003 | DeWitt, Jr. et al. | |
| 2004/0139305 | A1 | 7/2004 | Arimilli et al. | |
| 2005/0138471 | A1* | 6/2005 | Okbay | G06F 11/3636 |
| | | | | 714/25 |
| 2006/0184836 | A1* | 8/2006 | Al-Omari | G06F 11/2268 |
| | | | | 714/45 |
| 2007/0234016 | A1 | 10/2007 | Davis et al. | |
| 2009/0024878 | A1 | 1/2009 | Al-Omari et al. | |
| 2013/0132699 | A1 | 5/2013 | Vaishampayan et al. | |
| 2016/0041894 | A1* | 2/2016 | Reid, III | G06F 11/3636 |
| | | | | 714/45 |
| 2016/0283354 | A1* | 9/2016 | Lantz | G06F 11/3688 |
| 2016/0335379 | A1* | 11/2016 | Harn | G06F 17/5009 |
| 2017/0052876 | A1 | 2/2017 | Svensson et al. | |

OTHER PUBLICATIONS

List of IBM Patents or Patent Applications Treated as Related; (Appendix P), Filed Nov. 20, 2017; 2 pages.

Bartik et al., "Generating and Verifying Hardware Instruction Traces Including Memory Data Contents," U.S. Appl. No. 16/382,740, filed Apr. 12, 2019.

List of IBM Patents or Patent Applications Treated as Related; Date Filed: Jun. XX, 2019, 2 pages.

* cited by examiner

GENERATING AND VERIFYING HARDWARE INSTRUCTION TRACES INCLUDING MEMORY DATA CONTENTS

DOMESTIC PRIORITY

This application is a continuation of U.S. Non-Provisional application Ser. No. 15/602,618, entitled "GENERATING AND VERIFYING HARDWARE INSTRUCTION TRACES INCLUDING MEMORY DATA CONTENTS", filed May 23, 2017, which is incorporated herein by reference in its entirety.

BACKGROUND

The present invention relates generally to computer system performance modeling, and more particularly to providing improved trace data.

Data processing systems which use virtual addressing in multiple virtual address spaces are well known. Many data processing systems include, for example, a central processing unit (CPU) and a main storage. The CPU contains the sequencing and processing facilities for instruction execution, interruption action, timing functions, initial program loading and other machine related functions. The main storage is directly addressable and provides for high-speed processing of data by the CPU. The main storage may be either physically integrated with the CPU or constructed in stand-alone units.

In general, address spaces reside in main storage wherein an address space is a consecutive sequence of integer numbers (or virtual addresses), together with the specific transformation parameters which allow each number to be associated with a byte location in storage. The sequence starts at zero and proceeds left to right.

When a virtual address is used by a CPU to access main storage, it is first converted, by means of dynamic address translation (DAT), to a real address, and then, by means of prefixing, to an absolute address. DAT uses various levels of tables as transformation parameters and translates a virtual address of a computer system to a real address by means of translation tables. The designation (in the past, including origin and length) of a table is found for use by DAT in a control register or as specified by an access register.

Tracing assists in determining whether problems exist in the data processing system by providing an ongoing record in storage of significant events, or benchmarks. An example of a tracing system is the Console Monitoring System (CMS) Adjunct Tracing System (CATS), which consists of a coherent, sequential and generally contiguous set of architected instruction records which are captured while processing instructions through a data processing system.

SUMMARY

Embodiments of the present invention are directed to a computer-implemented method for generating and verifying hardware instruction traces including memory data contents. The method includes initiating an in-memory trace (IMT) data capture for a processor, the IMT data being an instruction trace collected while instructions flow through an execution pipeline of the processor. The method further includes capturing contents of architected registers of the processor by storing the contents of the architected registers to a predetermined memory location and causing a load-store unit (LSU) to read contents of the predetermined memory location.

In one or more examples, causing the LSU to read the contents of the predetermined memory location includes generating a memory fetch control record and a memory fetch data record in the IMT data capture. In one or more examples, a structure of the memory fetch control record is based on a type of the processor.

In one or more examples, the contents of the operands of the instruction are captured in response to a breakpoint. For example, the breakpoint is a fetch instruction from a time-dependent store location. For example, the breakpoint is an input-output type instruction. For example, the breakpoint is an external interrupt.

In one or more examples, the contents of the architected registers are captured in response to the IMT data capture being initialized in extended-IMT mode. Further, in one or more examples, in the extended IMT-mode, the IMT data capture also includes values of operands in the instructions being executed. The values of the operands are captured using memory fetch control and memory fetch data records, and their addresses are captured using source operand records and/or destination operand records.

In one or more examples, the contents of the architected registers are captured after every predetermined number of instructions are executed by the processor.

In one or more examples, the processor is a first processor, and the method further includes executing, using a second processor, the instruction traced by the first processor using the IMT capture data.

In one or more examples, the method further includes executing, using a simulated processor, the instruction traced by the processor using the IMT capture data.

In one or more examples, the contents of the operands are captured in response to the IMT data capture is initiated in extended-IMT mode. Implementations of the described techniques may include hardware, a method or process, or computer software on a computer-accessible medium.

Further, in one or more examples, the method further includes, prior to capturing the IMT data, verifying IMT data records. The verification is performed by generating a pseudo IMT capture using a first AVP file, generating a second AVP file using the pseudo IMT, and comparing the first AVP file and the second AVP file.

Embodiments of the present invention are directed to a system for generating and verifying hardware instruction traces including memory data contents. A non-limiting example of the system includes a memory and a processor coupled with each other. The processor receives a request to initiate an in-memory trace (IMT) data capture, the IMT data being an instruction trace collected while instructions flow through an execution pipeline of the processor. The processor captures content of architected registers of the processor in the IMT data by storing the contents of the architected registers to a predetermined memory location and causing a load-store unit (LSU) to read contents of the predetermined memory location.

Embodiments of the invention are directed to a computer program product for generating and verifying hardware instruction traces including memory data contents. The computer program product includes a computer-readable storage medium having program instructions embodied therewith. The program instructions are executable by a processor to cause the processor to perform a method. A non-limiting example of the method includes initiating an in-memory trace (IMT) data capture for a processor, the IMT data being an instruction trace collected while instructions flow through an execution pipeline of the processor. The method further includes capturing contents of architected registers of the processor by storing the contents of the architected registers to a predetermined memory location and causing a load-store unit (LSU) to read contents of the predetermined memory location.

Further, embodiments of the present invention include an apparatus for testing a processor. The apparatus may be a testing system. The apparatus receives a request to initiate an in-memory trace (IMT) data capture for a processor, the IMT data being an instruction trace collected while instructions flow through an execution pipeline of the processor. The apparatus captures content of architected registers in the IMT data by storing the contents of the architected registers to a predetermined memory location; and causing a load-store unit (LSU) to read contents of the predetermined memory location. The apparatus further generates a test sequence using the captured IMT data, the test sequence including the instruction and the contents of the architected registers from the captured IMT data. The apparatus further executes the test sequence using a second processor.

Further yet, embodiments of the present invention include a computer-implemented method for testing a processor, the method including initiating an in-memory trace (IMT) data capture for a processor, the IMT data being an instruction trace collected while instructions flow through an execution pipeline of the processor. The method further includes, in response to the IMT data captured initiated in an extended mode, capturing contents of architected registers of the processor in the IMT data by storing the contents of the architected registers to a predetermined memory location; and causing a load-store unit (LSU) to read contents of the predetermined memory location. The computer-implemented method also includes generating a test sequence using the captured IMT data, the test sequence including the instruction and the content of the architected registers from the captured IMT data. The computer-implemented method also includes executing the test sequence using a second processor.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
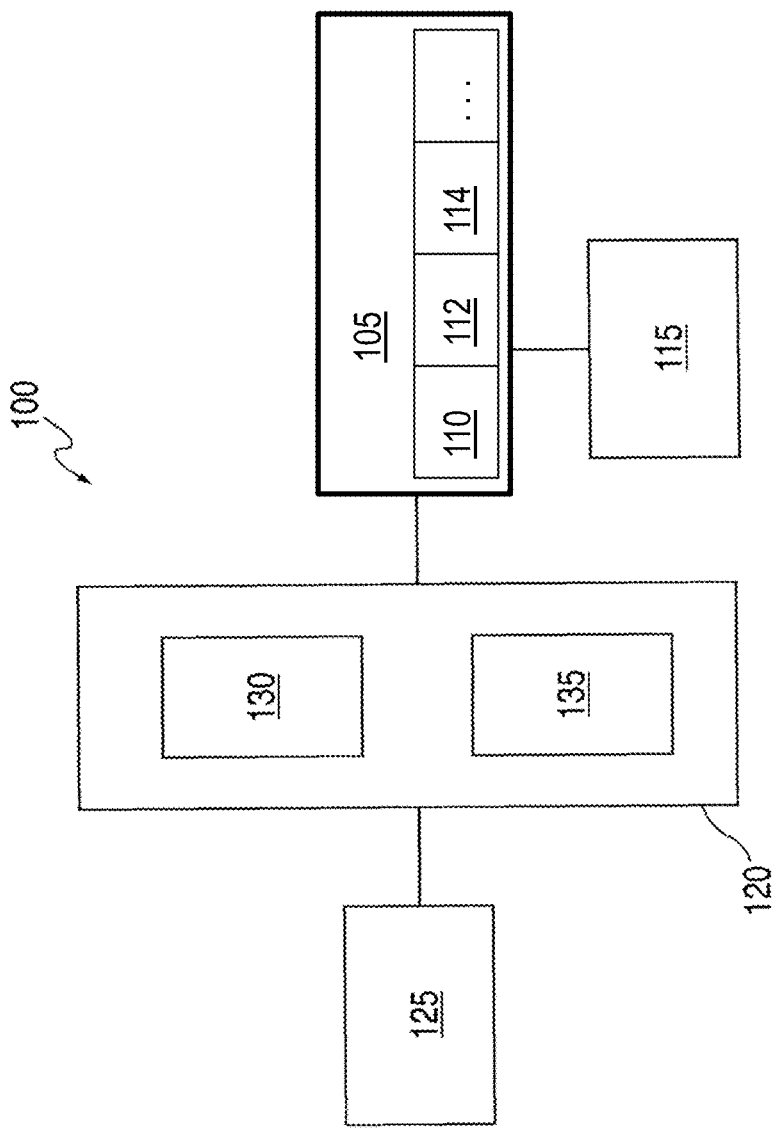
FIG. 1 depicts an exemplary embodiment of a system for implementing one or more technical solutions described herein.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one"

and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, a data processing system, such as computer server, capture in-memory trace (IMT) data that includes an instruction trace collected by hardware while instructions flow through an execution pipeline. For example, data processing systems such as z Systems® processor cores, include a function of capturing hardware instruction traces as IMT data. Capturing the IMT data have addressed and resolved the technical challenges of conventional tracing methodology using CMS Adjunct Tracing System (CATS) by enabling capture of traces with millicode instructions for complex workloads. Typically, such capture requires a highly skilled engineer and replication of the complex workload environment is performed in a virtual machine to capture the CATS traces. Previously such data were unable to be traced using CATS or had required a highly skilled engineer to replicate a complex workload environment in a virtual machine to capture CATS traces. However, unlike CATS traces, IMT traces do not provide memory data contents, which are used for reverse engineering data flow that enables the generation of CAP sequence test cases, via a controlled testing suite, such as a Complete Automation Package (CAP) testcase suite. CAP test cases have been used for performance verification of new processor cores by measuring/comparing infinite CPI (cycles per instructions) on core performance model, core hardware description language (e.g. VHDL) simulator, and actual hardware. Such a lack of data contents in IMT trace prevents reflecting new customer workloads using new instruction sets for performance verification, which is crucial for developing next-generation processor cores.

Turning now to an overview of the aspects of the invention, one or more embodiments of the invention address the above-described technical challenges by facilitating generating and verifying hardware instruction traces including memory data contents in IMT. The technical features herein further facilitate generating CAP test cases from IMT traces using existing infrastructures and tools. Further, the technical features facilitate verifying the memory data contents.

Turning now to a more detailed description of aspects of the present invention, referring to FIG. 1, there is provided a data processing system 100. The system 100 includes a central processor or central processing unit (CPU) 105. The CPU 105 may include any suitable components, such as an instruction fetch unit 110, and may be coupled in communication with a memory 115.

Typically the instruction fetch unit 110 (IFU) is employed to fetch instructions on behalf of the processor 105. The IFU 110 either fetches "next sequential instructions", target instructions of branch taken instructions, or first instructions of a program following a context switch. In one or more examples, IFU 110 employ prefetch techniques to speculatively prefetch instructions based on the likelihood that the prefetched instructions might be used. For example, the IFU 110 fetches 16 bytes of instruction that includes the next sequential instruction and additional bytes of further sequential instructions.

The fetched instructions are then executed by the processor 105. In one or more examples, the fetched instruction(s) are passed to a dispatch unit of the IFU 110. The dispatch unit decodes the instruction(s) and forwards information about the decoded instruction(s) to appropriate units of the processor 105. For example, the processor 105 includes an execution unit 112 that receives information about decoded arithmetic instructions from the IFU 110 and performs arithmetic operations on operands according to the opcode of the instruction. Operands are provided to the execution unit 112 preferably either from memory 115, architected registers of the processor 105, and/or from an immediate field of the instruction being executed. Results of the execution, when stored, are stored either in memory 115, architected registers, and/or in other machine hardware (such as control registers, PSW registers and the like).

The processor 105 also includes a load/store unit 114 (LSU). The processor 105 accesses storage using the LSU 114. The LSU 114 performs a load operation by obtaining the address of the target operand in memory and loading the operand in a register or another memory location, or performs a store operation by obtaining the address of the target operand in memory and storing data obtained from a register or another memory location in the target operand location in memory. In one or more examples, the LSU 114 is speculative and may access memory in a sequence that is out-of-order relative to instruction sequence, however the LSU 114 is to maintain the appearance to programs that instructions were executed in order. The LSU 114 communicates with components of the processor 105, such as IFU 110, execution unit 112, registers, decode/dispatch unit, cache/memory interface or other elements of the processor 105 and comprises various register circuits, ALUs and control logic to calculate storage addresses and to provide pipeline sequencing to keep operations in-order. Some operations may be out of order but the load/store unit provides functionality to make the out of order operations to appear to the program as having been performed in order, as is well known in the art.

Typically, addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. For example, in some processors, a hierarchy of translation is provided including a region first table, a region second table, a region third table, a segment table and an optional page table. The performance of the address translation is often improved by utilizing a translation lookaside buffer (TLB), which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor 105 is a processor of a multi-processor system, each processor has responsibility to keep shared resources, such as I/O, caches, TLBs and memory, interlocked for coherency. Typically, "snoop" technologies are utilized in maintaining cache coherency. In a snoop environment, each cache line may be marked as being in any one of a shared state, an exclusive state, a changed state, an invalid state and the like in order to facilitate sharing.

The processor 105 may be coupled in communication with a number of TLBs, which are cache memories that generally hold only translation table mappings. On every reference, the TLB is used to look up a virtual page number for the reference. If there is a hit, a physical page number is used to form the address, and the corresponding reference bit is turned on. If a miss in the TLB occurs, and if the referenced page exists in memory, the translation can be loaded from the page table in the memory 115 into the TLB and the reference can be tried again. If the page is not present in the memory 115, a page fault has occurred and the CPU must be notified with an exception.

In one embodiment, the TLBs include a first level TLB 120 or "TLB1", and a second level TLB 125 or "TLB2" that supports the TLB1. In one embodiment, the TLB1 includes an instruction cache (I-cache) 130 corresponding to an instruction TLB or "ITLB" and a data cache (D-cache) 135 corresponding to a data TLB or "DTLB."

The TLBs are described herein, without limitation, as an embodiment adapted to z Systems® architecture. This architecture uses TLB combined region-and-segment-table entries (CRSTE) connected to TLB page-table entries (PTE), where first regions, then segments and thereafter pages is the order in which address translation takes place.

It should be noted that examples herein are described in conjunction to architecture of z Systems®, however the system 100 can be used in conjunction with any suitable computer architecture in other examples.

The system 100 described herein is merely exemplary. The system may include any additional components as necessary to provide for processing of data. Exemplary components include, without limitation, storage, memory, input devices, output devices and the like. As these components are known to those skilled in the art, these are not depicted in any detail herein.

Figure 2:
FIG. 2 depicts an exemplary embodiment of a trace segment table.

In one or more examples, the IMT is captured as a trace segment table, including a variety of record types. As used herein, "table" refers to a collection of trace segments, which may take any suitable form, such as a virtual or memory page. One or more record types may make up one or more trace record segments and may be referred to as Translations Instructions Addresses, or "TrInA", record segments. These records may be created by different units, such as the CPU 105, and may be stored, for example, in memory 115 or other suitable location. It should be noted that for an instruction executed, a group of IMT records are collected. The number and type of records are dependent on the instruction type. For example, a memory instruction that results in fetching/storing operand results in the IMT including SRCOP and/or DESTOP records (depending on the number of operands). If either instruction fetch or data fetch misses TLB1 then, all of some of translation records (Virtual address . . . PTO records) are written depending on the CRSTE/PTE hit and level of translation table required for the address translation. FIG. 2 shows "possible types of IMT records" that are written for each instruction being executed. Thus, a "trace record segment" refers to a group of IMT records written per instruction and "TrInA" refers to a group of "trace record segments," which, in one or more examples, is the whole IMT trace having multiple instructions.

Referring to FIG. 2, there is provided a trace segment table 200 including multiple trace record segments. Each record segment provides specific information relative to a system event, for example, an instruction. The record segments depicted are exemplary, and it should be noted that in other examples, the IMT may include fewer, addition, and/or different trace record segments. Further, in the embodiment described herein, each record segment is a 64-bit record including bits 0-63. However, this configuration is exemplary, and any suitable type or size of the record segments may be used. The trace segment table depicted includes one or more of the following instruction record segments:

an instruction record 300 for each instruction (from fetched instruction, which is the instruction being processed/executed);

an instruction Address (IA) and Time of Day (TOD) record 400 (i.e., IA+TOD) (from fetched instruction);

an Instruction Translation Lookaside Buffer (ITLB) record 500 (from TLB1); and operand records as necessary (from fetched instruction), such as source operand record 600 and destination operand record 700. Depending on the instruction type, zero or more operand records may be generated.

In one or more examples, the trace segment table 200 may also include a Primary Address Space Number (PASN) record 800 (from fetched instruction).

Alternatively, if the system area is accessed, the ITLB and operand records may include:

an ITLB System Area record 900 (from TLB1); and operand system area records (from fetched instruction) as necessary, such as source operand (system area) record 1000 and a destination operand (system area) record 1100.

In the situations where a TLB miss occurs, various translation records may be generated. Multiple layers of translation are supported and may be encoded in these translation records. Dependent upon the types of record segments passed, and the specific bit values, the type of translation miss or hit may be determined, and where the system the translation activity took place may also be determined, e.g. where in the PTE/CRSTE. Examples of such translation records include:

a virtual address record 1200 (from TLB1 and/or TLB2);

an absolute address record 1300 (from TLB1 and/or TLB2);

an address space control element (ASCE) record 1400 (from TLB1 and/or TLB2);

a region second table origin (RSTO) record 1500 (from TLB2);

a region third table origin (RTTO) record 1600 (from TLB2);

a segment table origin (STO) record 1700 (from TLB2); and a page table origin (PTO) record 1800 (from TLB2).

In one or more examples, a comment record 2000 may also be included in the trace segment table 200. The comment record may be added during post-processing.

There is provided a method for generating trace segments, generating traces from the trace segments and validating generation results. The method includes one or more of the following stages. Note that the method need not include every stage described herein, and is not limited to the order in which the stages are presented. The method is described herein in conjunction with the system 100, although the method may be performed in conjunction with any type, number and configuration of processors or processing systems.

In a first stage, a minimum number of trace segments is determined. For example, if a TLB miss occurs, translation information may be loaded into the TLB1, for example, and translation records such as the virtual address, absolute address and ASCE records may be generated as trace segments. In another example, operand information from an instruction may be used to determine whether operand record segments should be generated.

In a second stage, various trace segments as described above may be generated. Information for the trace segments may be taken from any needed storage areas and may utilize various pages such as the instruction, PSW, ASCE, etc.

Figure 3A:
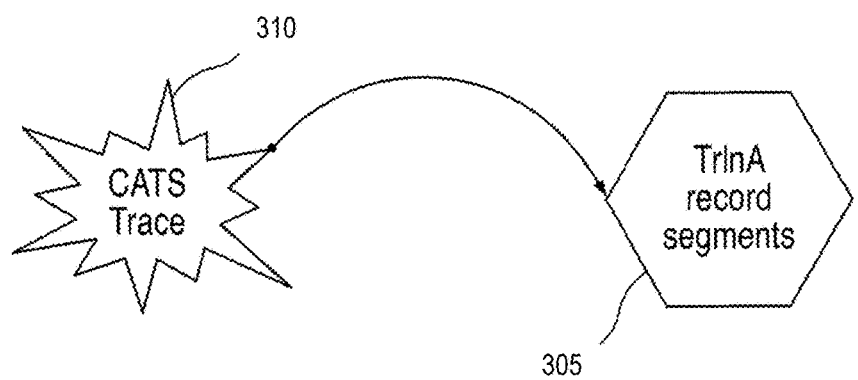
FIGS. 3A-3D depict a method for generating trace data as described herein.

Referring to FIG. 3A, in one embodiment, trace record segments 305 may be generated by taking information from a trace 310. The trace 310 may be a pre-calculated trace, or may be generated during the method described herein. In one embodiment, the trace is generated via the CMS Adjunct Tracing System, i.e., is a CATS trace, although any suitable systems or processes may be employed to generate the trace.

In one embodiment, a C (or other programming language) program is created to generate the trace record segments, which will allow users to determine how much data to be put out in various environments. The program may also be used to prepare for processing the actual record segments.

Figure 3B:
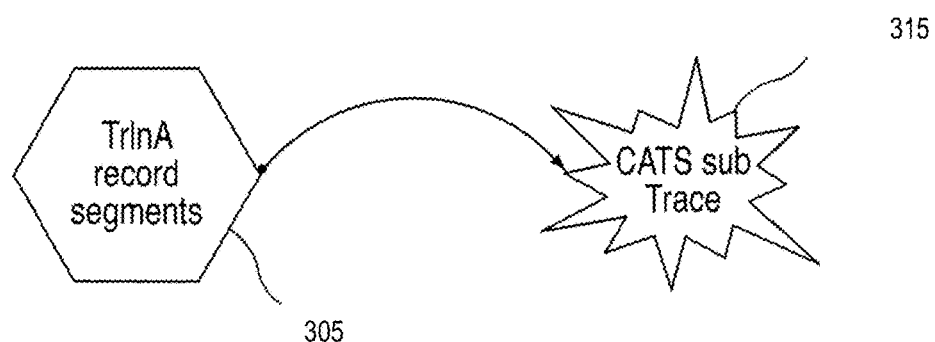

Referring to FIG. 3B, in a third stage, record segments 305 are processed to generate a sub-trace 315. Sub-traces 315 are of the same format as the trace 310, but have pieces of data missing relative to the trace 310. In one embodiment, the sub-trace 315 is a CATS sub-trace.

In one embodiment, a C (or other programming language) program is written to process the record segments 305 and generate the CATS sub-trace 315. The same C program may be later used to process the record segments 305 generated by a system hardware.

Figure 3C:
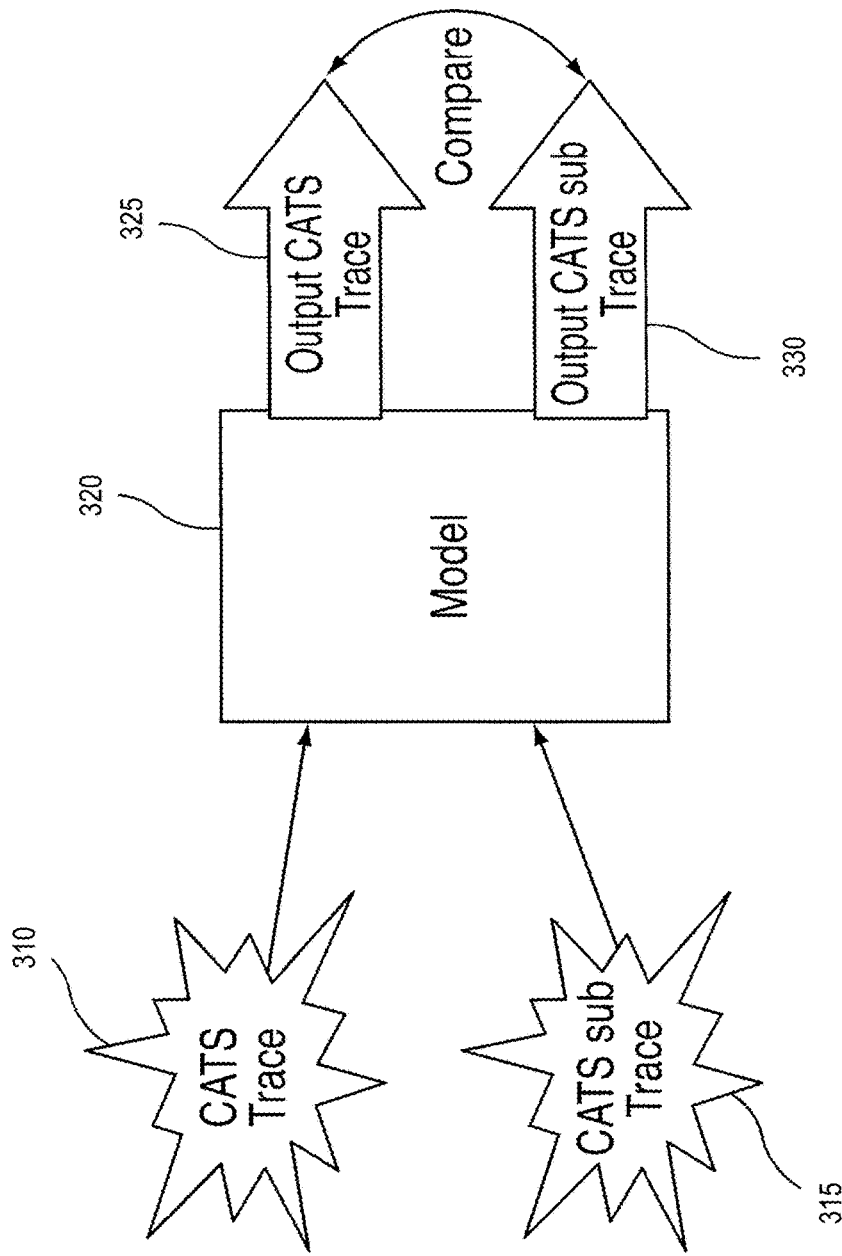

Referring to FIG. 3C, in a fourth stage, the sub-trace generation process may be validated. In one embodiment, the sub-trace 315 and the trace 310 are inputted into a model 320, such as a performance model that simulate various portions of the system 100, including the processor, a cache, one or more TLBs, and others. A trace output 325 and a sub-trace output 330 are generated. The sub-trace output 330 may be compared to the trace output 325 to determine whether the sub-trace 315 was properly generated.

Figure 3D:
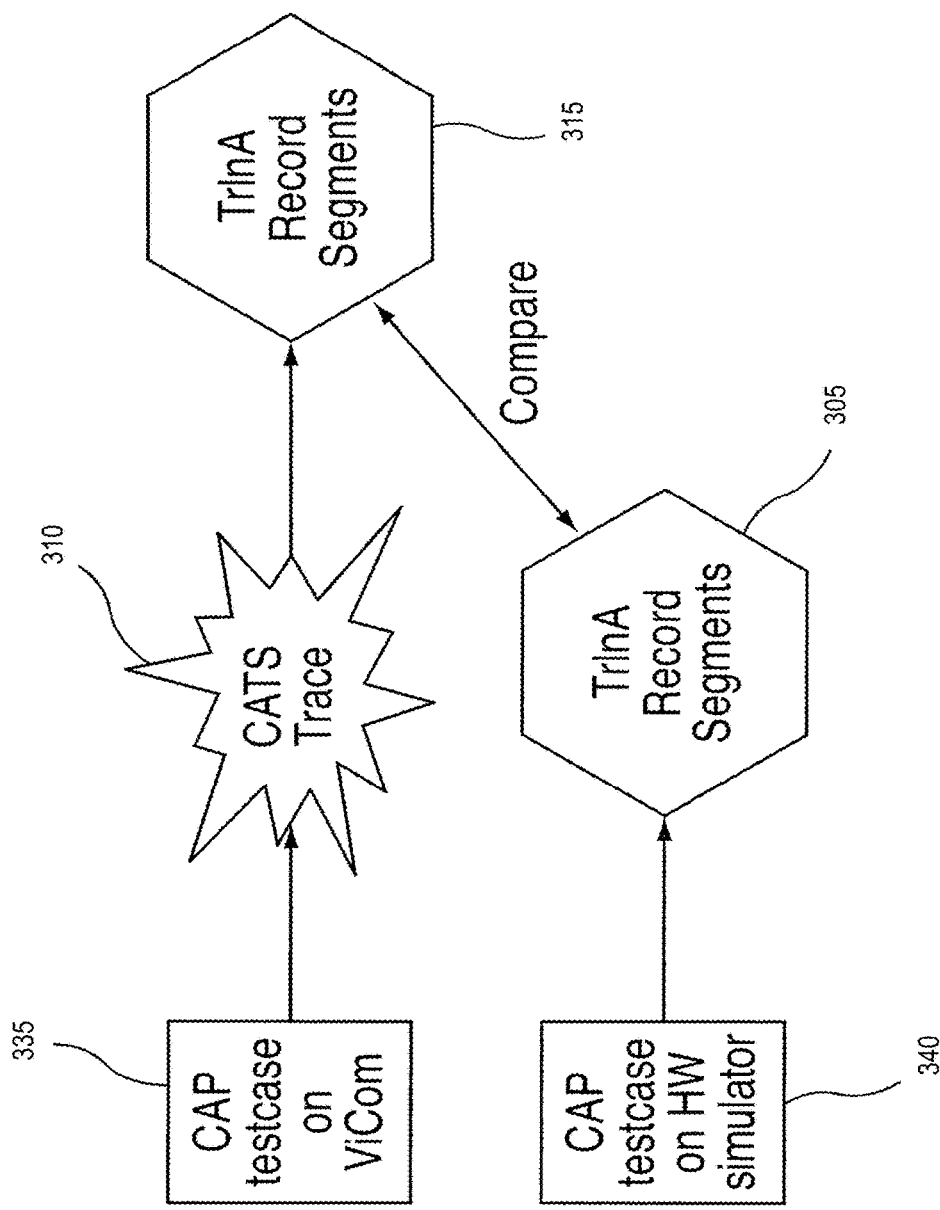

Referring to FIG. 3D, in a fifth stage, the trace segment generation process may be validated by generating the trace 310 and the trace segments 305 via a controlled testing suite, such as a Complete Automation Package (CAP) testcase suite. For example, the trace 310 may be generated via a CAP testcase 335 on IMT testing systems, such as proprietary internal systems, and the trace segments 305 may be generated from the trace 310. Also, the trace segments 305 may be independently generated from a hardware simulator 340, and compared to the trace segments 305 that are generated from the trace 310 to validate the generation process.

It should be noted that in one or more examples, pseudo-IMT is generated before a VHDL simulator of a processor that is being tested/evaluated is available. For example, the pseudo-IMT is generated from a core model, (CPI analysis tool in FIG. 4). Accordingly, the IMT contents and post-processing are verified using the pseudo-IMT in such cases as described in the following examples herein.

It should be noted that the method described herein is just an example. There may be many variations to the stages (or operations) described therein without departing from the spirit of the invention. For instance, the stages may be performed in a differing order, or steps may be added, deleted or modified. All of these variations are considered a part of the claimed invention.

Figure 4:
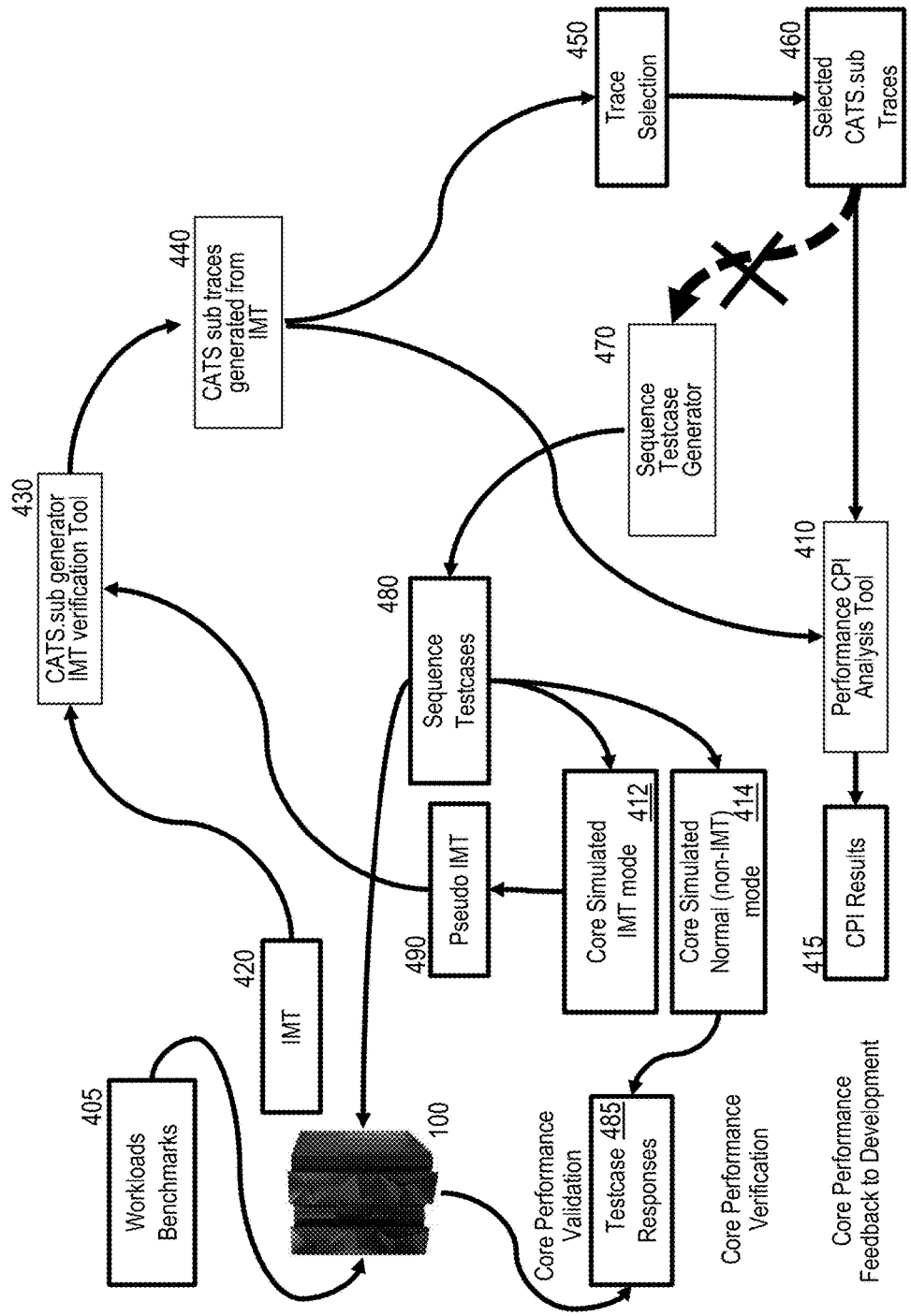
FIG. 4 depicts capturing IMT according to one or more embodiments of the present invention.

However, one of the technical limitations of the IMT captured using the existing techniques is depicted in FIG. 4. Because no data contents are captured in the IMT using the existing techniques, it results in a lack of CAP testcases for new workloads of the system 100, as shown by the paths marked with 'X'. CAP testcases are used for core performance verification of new processor cores by measuring/comparing infinite CPI (cycles per instructions) by a performance CPI tool 410. The CPI measurements are performed on core performance model, core VHDL simulator, and/or actual hardware of the system 100. For example, in the depicted scenario, the system 100 executes one or more workload benchmarks 405 and captures IMT 420 during the execution. The IMT 420 is used for generating CATS traces 440 using a CATS generator tool 430. The selected traces 460 (450 is selection) are used by the performance CPI analysis tool 410 for generating the CPI results 415. The CPI results 415 are then used for core performance feedback for further development, as well as for core performance verification. However, the lack of data contents in the IMT 420 prevents a subsequence test generator, such as CAP from generating sequence testcases 480. The sequence testscases are then used by the system 100 to generate test responses 485. In a similar manner, test responses 485 are generated from a simulated model of the system 100 in IMT mode 412 and in non-IMT mode 414. In one or more examples, the performance verification/validation is done by comparing outputs from non-IMT mode VHDL simulator and performance CPI analysis tool and actual machine. The IMT mode VHDL simulator creates pseudo-IMT to develop CATS.sub generator and IMT verification tool that is used to verify the IMT contests at development stage before actual machine is available. The test responses 485 from the different underlying system-under-test (SUT) are compared for core performance validation. However, the sequence testcases 480 are generated independent from the IMT 420, requiring additional efforts and costs. Thus, the lack of data contents in the IMT 420 results in inability to reflect new customer workloads using new instruction sets for performance verification.

The technical solutions described herein for capturing the IMT address such technical challenges. For example, in addition to the records above, the technical solutions described herein facilitate the collection of information to build initial contents of all architected registers and memory accessed by instructions in testcase, so that a CMD or AVP file can be created from the captured IMT. A CMD file is a file containing initial contents of all architected registers and memory accessed by instructions in testcase, which can run on test systems, such as on IMT testing systems, such as proprietary internal systems. An AVP file is file containing initial contents of all architected registers and memory accessed by instructions in testcase, which can run on VHDL core simulator.

Figure 5:
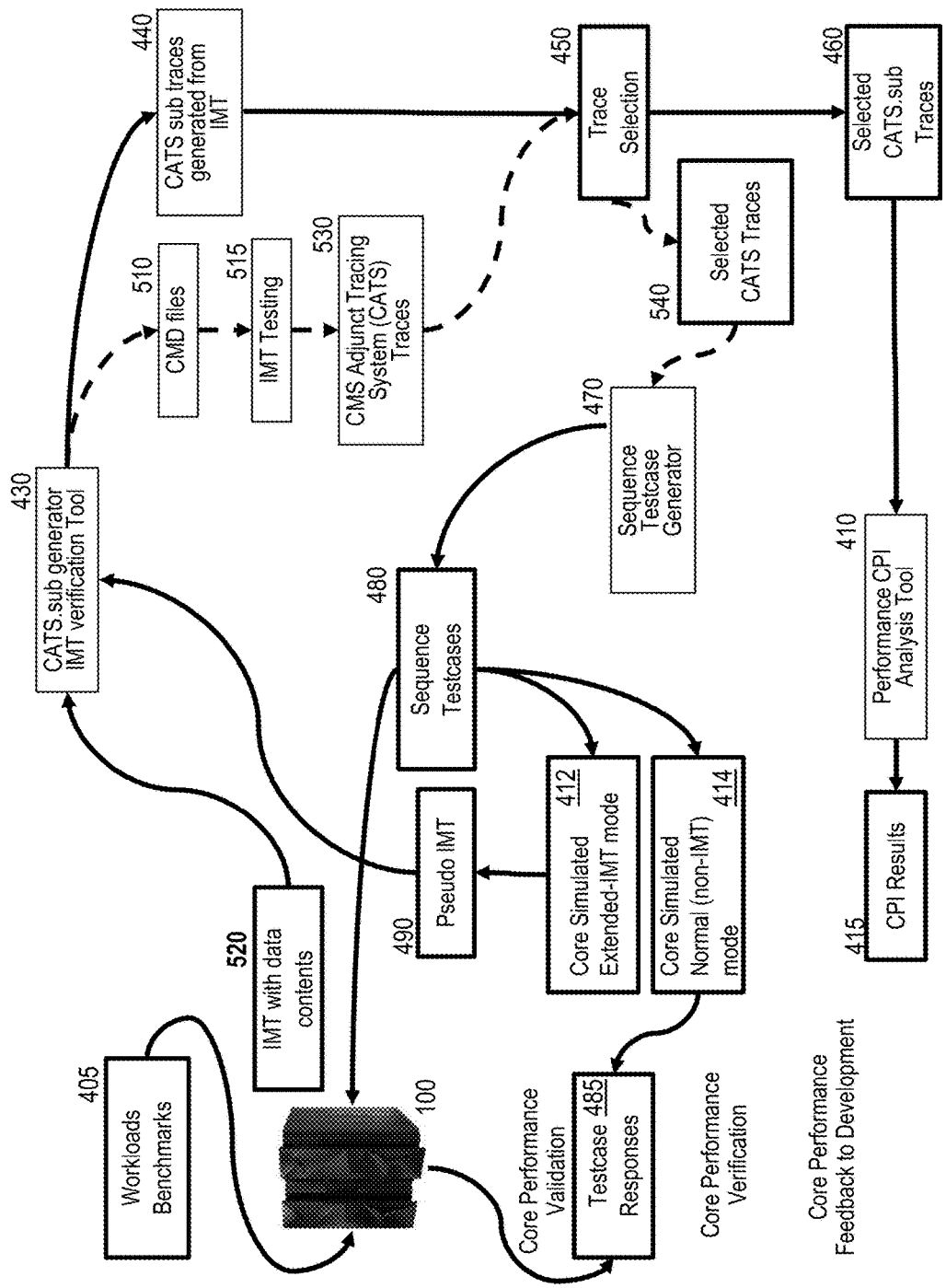
FIG. 5 depicts capturing IMT according to one or more embodiments of the present invention.

FIG. 5 depicts a dataflow for comparison with the above scenario from FIG. 4 when using the technical solutions herein to capture the data contents in the IMT. As depicted, CMD files are generated from IMT with the data contents 520. The CMD files facilitate the sequence test generator 470 to generate the CAP sequence testcases 480 for new workloads using existing infrastructures and tools. In one or more examples, the CMD files are processed by a test system 515, such as on IMT testing systems, such as proprietary internal systems to generate CATS traces 530. The trace selection 450 selects a subset of the CATS traces 540, which are used by the sequence test generator 470 to generate the sequence testcases 480.

To facilitate the above scenario, of using the IMT trace with memory data contents 520 to directly generate the sequence testcases 480, the system 100 collects all necessary information in IMT 520 to enable instruction execution (such as for z Systems®) in VHDL sim or real hardware. In one or more examples, because collecting the memory data contents causes additional slowdown, the system 100 can be run in two different modes, a normal-IMT mode and an extended-IMT mode. Normal IMT mode generates instruction traces without the memory data contents, and thus with traces that are enough to drive core performance model, like in FIG. 4. The extended-IMT mode generates instruction traces with memory data contents that are required to generate CAP testcases, as in FIG. 5.

Figure 6:
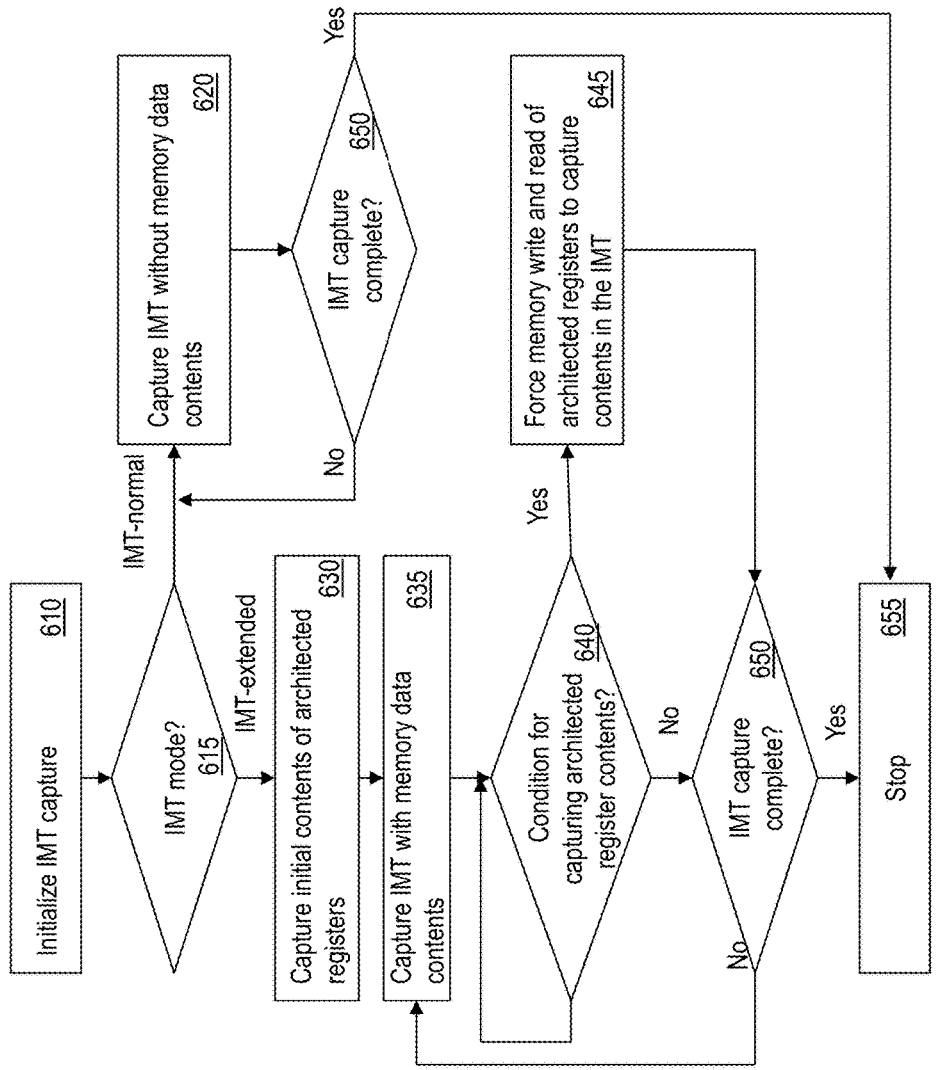
FIG. 6 illustrates a flow chart of an example method for capturing memory data contents in IMT, according to one or more embodiments of the present invention.

FIG. 6 illustrates a flow chart of an example method for capturing memory data contents in IMT, according to one or more embodiments of the present invention. The processor 105 receives the request to initialize the IMT capture, as shown at 610. For example, the request includes one or more millicode instructions. Further, the request indicates the mode in which to capture the IMT, viz.normal-IMT or extended-IMT. If the normal-IMT mode is selected, which indicates that the memory data contents are not to be captured to generate the sequence testcases, the processor proceeds to only capture IMT with instructions data, as described earlier, without the memory data contents, such as operand values, as shown at 615 and 620.

Instead, if the extended-IMT mode is selected, the processor captures the memory data content for generating the sequence testcases, as shown at 615. In one or more examples, in the case of the extended-IMT mode, the processor 105 uses the LSU 114 to write MFC (memory fetch control) and MFD (memory fetch data) records for all instructions whose operand fetches data from memory.

For example, as depicted in FIG. 6, the processor captures initial contents of architected registers, as shown at 630. In one or more examples, the initial contents are captured by executing one or more millicode instructions for writing all architected registers contents in pre-defined order into pre-defined memory location and reading the stored contents back from the same pre-defined memory location. Such sequential write and read operations cause the LSU 114 to write the MFD/MFC records with operand record containing operand addresses (addresses of the pre-defined memory location). This information can then be used, for example by a post-processing program to parse the IMT and capture the initial contents of specific registers using the pre-defined order and their memory location. The processor 105 further captures the IMT of the instructions being executed, as shown at 635.

The processor 105 continues the IMT capture until a condition for capturing contents of the architected registers occurs, as shown at 640. In response to the condition, the processor captures the contents of the architected registers by forcing a memory write and read of architected registers to capture contents in the IMT using the LSU 114, as shown at 645. Any memory data that is fetched by one of the instructions being executed is captured by LSU as MFC and MFD records (described herein). IMT operand records (SRCOP/DESTOP) and the data records (MFC/MFD) can be parsed to determine address and data of the operands of the instruction, respectively. For example, MFC record has only part of operand address. The OPC count and the partial address in the MFC record are used to find corresponding SRCOP/DESTOP to get full operand address. In addition, in response to triggering the breakpoint, writing/reading predefined memory (645) is performed for capturing the contents of all the architected registers after breakpoint (similar to the initiation of the IMT). By using the LSU to read/write the contents of the architected registers, the technical solutions can generate write operand records and data records that can in turn be parsed to determine register types and contents by looking the operand address and data of the predefined memory in the MFC and MFD records. Because, the contents of the architected registers are written in a predefined manner, parsing the MFD record in the same predefined manner identifies which architected register contents are stored at which location in the MFD record that is read.

In one or more examples, in the IMT-extended mode, until the condition that initiates capturing the architected register contents the IMT capture continues to include the data that the instruction accesses from memory. For example, the opcode of the instruction may be used to determine if the instruction access data from the memory 115. For example, instructions opcode from a predetermined subset are identified as instructions that access memory contents. Alternatively, or in addition, the operands of the instructions are used to determine if the memory contents are being accessed. For example, if the operands include memory addresses, the instruction may be deemed to access memory contents. It should be noted that the above are a few examples, and that in other embodiments of the present invention, the processor 105 may determine that the instruction being traced accesses memory contents in a different manner. The operand data is captured by the IMT using the MFC and MFD records, and the addresses of the operands are captured using SRCOP and/or DESTOP records. The MFC record contains the information that is used to parse the operand values from the MFD record.

Alternatively, or in addition, the condition that initiates the architected register contents to be captured includes that a predetermined number of instructions have been executed since the most recent architected register content capture. For example, in order to allow multiple CAP testcases to be generated from the captured IMT trace, writing and reading architected registers is forced to occur every K number of instructions completed, K being configurable. For example, the initialization request includes a value to use for K. Thus, once a testcase needs to be stopped at a breakpoint, next testcase can start again at any point where IMT provides a snapshot of all architectural registers. The breakpoint in the CAP testcase can include an instruction of specific type. For example, the breakpoint can include a fetch from a time dependent store location, an IO instruction, an external interrupt, an instruction not providing enough information for testcase generation, among others and/or a combination thereof The processor 105 further checks if the IMT capture is complete, as shown at 650. For example, the IMT capture can complete in response to the currently executing program is complete, a specific IMT capture complete request is received, a manual interruption of the IMT capture, and a combination thereof among other operations to stop the IMT capture. If the IMT capture has not completed, the processor continues to monitor next instruction to capture IMT records depending on the IMT-mode. In the extended IMT-mode, the processor also monitors for an occurrence of the condition to capture architected register contents. Else, if the IMT capture is completed, the processor stops capturing the IMT until further initialization requests, as shown at 655.

Figure 7:
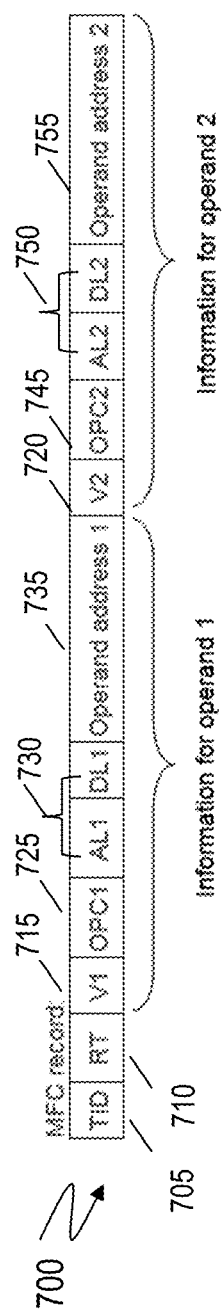
FIG. 7 depicts an example MFC record that is used to capture the data contents from the memory in the IMT capture, according to one or more embodiments of the present invention.

FIG. 7 depicts an example MFC record 700 that is used to capture the data contents from the memory in the IMT capture, according to one or more embodiments of the present invention. It should be noted that the depicted example is just one implementation, and that in other embodiments, the processor 105 may use different configurations of the MFC record 700. In one or more examples, the MFC record 700 is generated by the LSU 114 per each cycle when data is fetched. MFC can cover 1 or 2 operands. For example, in case of normal loads/ISU-ops, only 1 operand is active, if the instructions uses a single memory access. While in the case of sequencer operations, two data operands are active representing two memory accesses.

In the example depicted that MFC record has 64 bits and includes the fields as depicted in FIG. 7. It should be noted that in other examples, the MFC record 700 may include different number of bits and different, more, or fewer fields than those depicted. As illustrated, the MFC record 700 includes a thread-identifier 705 that is a unique identification of a thread that is writing the MFC/MFD records. The MFC record 700 further includes a report type identifier 710 that indicates that the current record type is an MFC record. The MFC record 700 further includes a first validity indicator 715 for a first memory data. The validity indicator indicates if the memory data contents are valid and can be used for testing.

Further, the MFC record 700 includes an operand count field 725 that indicates with which operand in the instruction the first memory data is associated. For example, if the first memory data is associated with a first operand in the instruction, the operand count field 725 has a first value, such as 0, and instead, if the first memory data is associated with a second operand in the instruction, the operand count field 725 has a second value, such as 1. The MFC record 700 further contains a first memory data information fields 730 that include information about the first memory data such as alignment, length, among others. The MFC record 700 further contains a first address field 735 that includes the memory address of the first memory data. In one or more examples, the field 735 includes only a few predetermined bits of the memory address, such as the last 8 bits, last 9 bits. This address and OPC1 are used to determine/validate full operand address from operand records (DESTOP/SRCOP), which are separate records having full operand addresses.

It should be noted that the depicted MFC record 700 has information for two operands to work in case of an instruction having two fetch operands. If an instruction has only one operand, the MFC record 700 has only one valid operand information. For example, for a RISC processor, the MFC record 700 only has one operand information.

In this case, the MFC record 700 further includes similar fields corresponding to the second memory data. For example, the MFC record 700 includes a validity indicator field 720 indicating validity of the second operand, and an operand count field 745 that indicates with which operand in the instruction the second memory data is associated. For example, if the second memory data is associated with a first operand in the instruction, the operand count field 725 has a first value, such as 0, and instead, if the first memory data is associated with a second operand in the instruction, the operand count field 745 has a second value, such as 1. The MFC record 700 further contains a second memory data information fields 750 that include information about the first memory data such as alignment, length, among others. The MFC record 700 further contains a second address field 755 that includes the memory address of the second memory data. In one or more examples, the field 755 includes only a few predetermined bits of the memory address, such as the last 8 bits, last 9 bits.

If an operand fetches more than 8 bytes, multiple MFC records are written. For example, in z Systems® an operand can fetch up to 256 bytes, which requires 32 MFC/MFD records as depicted above. If an instruction fetches two operands, there can be 32 MFC records (covering both operands) followed by 64 MFD records.

In one or more examples, all MFC records for the same operand are written consecutively. How an MFD record is identified from an MFC record depends on the implementation. In one or more examples, all MFC records are written consecutively and followed by all MFD records and the MFD records are interleaved when MFC record has two valid operands. The total number of valid operand information should be the same as the number of MFD records. Once a corresponding MFD record is identified, the actual data in the MFD record is determined using alignment and data length information in the corresponding MFC record. Depending on the arrangement of the MFC and MFD records, parsing and determining the information can vary in other implementations.

Figure 8:
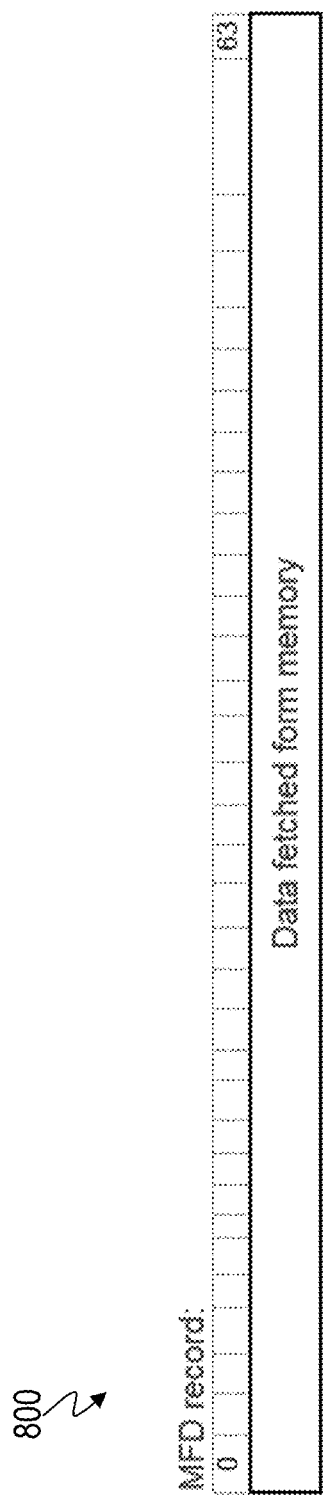
FIG. 8 illustrates an example MFD record, according to one or more embodiments of the present invention.

FIG. 8 illustrates an example MFD record 800, according to one or more embodiments of the present invention. It should be noted that in other examples, the MFC record 700 may include a different number of bits and different, more, or fewer fields than those depicted. The MFD record includes the contents of the memory address specified in the MFC record 700, such as the fields 735 and 755.

Thus, the IMT data captured includes trace data related to a system event. In one or more examples, the processor 105 receives an instruction relating to the system event from a location in the processor 105, such as a TLB, a IFU, an execution unit, etc. Generating the IMT data further includes determining a minimum number of trace segment records required to record instruction information. The processor 105 creates a trace segment table including the number of trace segment records, the number of trace segment records including at least one instruction record. In one or more examples, the processor 105 further generates a sub-trace from the trace segment records, the sub-trace having a fewer number of data records than a trace generated for the instruction. Additional details of generating the IMT data is provided in U.S. Pat. No. 7,975,182, contents of which are incorporated herein.

Further, the technical solutions herein facilitate validating the trace segment table by generating the trace and a first instance of the trace segments via a controlled testing suite, generating a second instance of the trace segments from the trace, and comparing the first instance and the second instance.

For example, referring back to FIG. 5, a dataflow for a method for generating CAP testcases from IMT captured, according to one or more embodiments of the present invention is depicted. The CAP testcases can be generated using existing infrastructures and tools. For example, with the initial contents of architected registers and memory available in IMT, a post-processing program creates CMD file by parsing the IMT captured. The CMD file is run on a test suite such as an IMT testing system, which may be an proprietary internal system, and generate CATS trace. The CATS trace is fed into tools such as the existing CAP test cases generation tool to generate CAT testcase. This method using the improved IMT generated as described herein avoids substantial efforts and complexity required to develop a separate reference model by generating the CAP testcase from the IMT directly.

Figure 9:
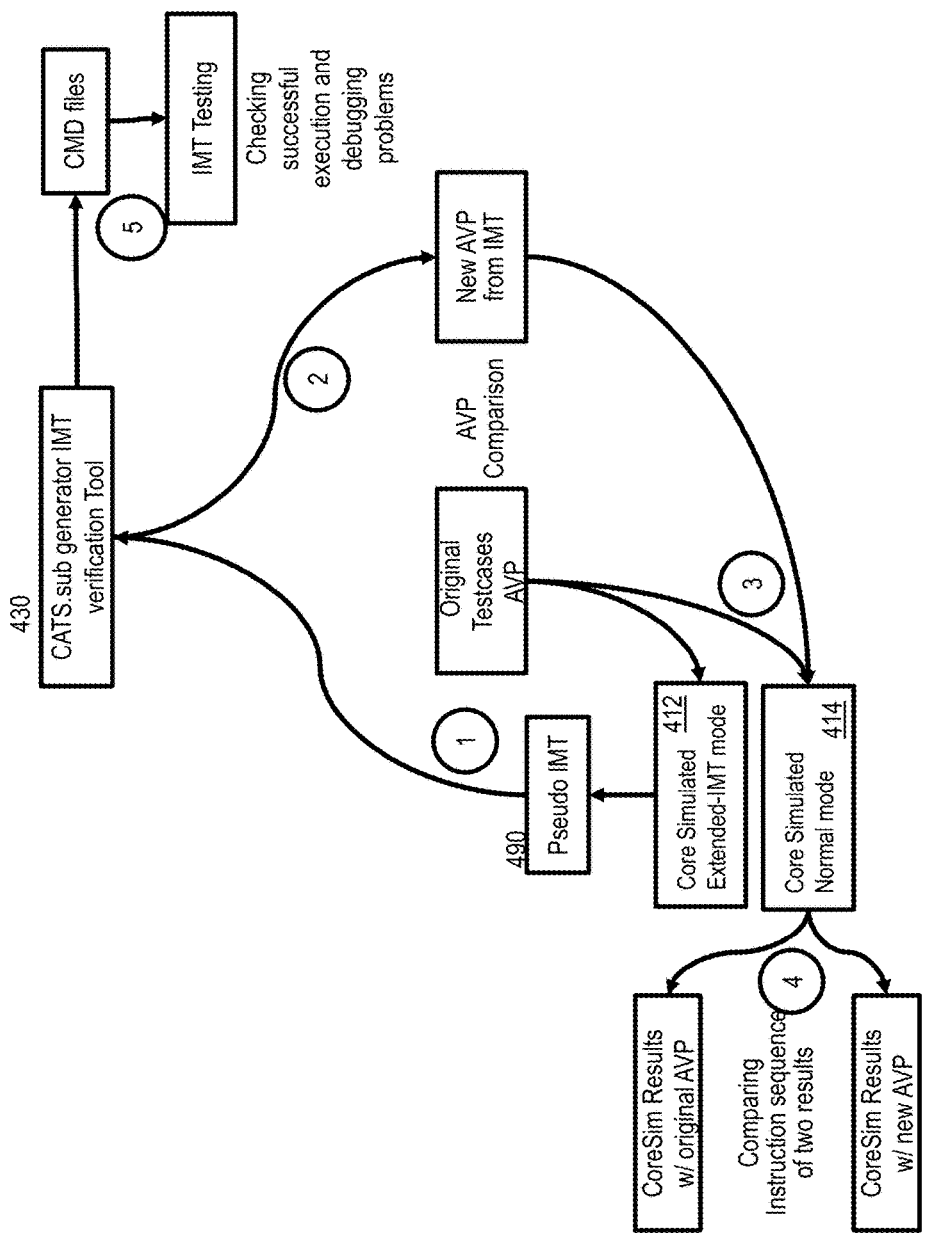
FIG. 9 illustrates a flow chart of an example method for verifying memory data contents, according to one or more embodiments of the present invention.

The technical solutions further include a method of verifying memory data contents captured by the IMT capture techniques described herein. FIG. 9 illustrates a flow chart of an example method for verifying IMT capture records, according to one or more embodiments of the present invention. The IMT capture records are to be verified before the processor to be evaluated/tested is available, and thus before the IMT 520 is available. For example, pseudo IMT 490 is generated from a core simulator using the AVP file. The AVP file is pre-existing. The AVP file is a architecture verification program file which has initial contents of architected registers and memory contents for the instructions and data being used for the testcase for hardware verification by running on a simulator, such as a VHDL model. CMD file is a command file that has the same contents as the AVP file but in a different format and is used to run on testing suite such as on IMT testing systems, such as proprietary internal systems.

In one or more examples, the pseudo-IMT 490 is generated using the extended-IMT mode. The core simulator is a model that simulates the processor 105 and/or hardware components being tested, for example, a VHDL simulated model. The IMT captured by the simulator is referred to as the pseudo IMT 490. Further, the method includes generating a new AVP file from the pseudo IMT 490 through the post processing program. The method further includes comparing the original and new AVP files to see any mismatch on register/memory contents. For example, for comparing the AVP files, both AVP files are executed on the core simulator and the responses from both executions are compared. The pre-existing AVP file and the new AVP file generated using the pseudo IMT 490 are executed in the core simulator in non-IMT mode to compare them. In one or more examples, a CMD file 510 is generated from the pseudo IMT 490 and run on IMT testing systems, such as proprietary internal systems or any other test suite to debug any problem that may not be debugged with the AVP comparison or core simulator.

Figure 10:
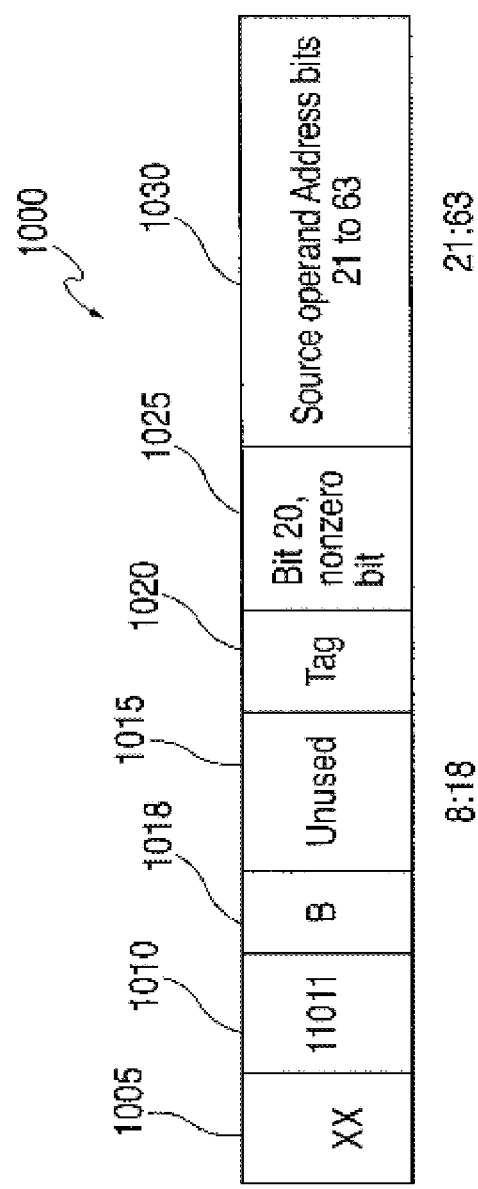
FIG. 10 illustrates an example source operand (SRCOP) record, according to one or more embodiments of the present invention.

Referring to FIG. 10, the source operand (system area) record 1000 (SRCOP) is shown, according to one or more embodiments of the present invention. In one embodiment, the source operand (system area) record 1000 includes a plurality of regions 1005-1030. An ID region 1005, corresponding to bits 0-1, identifies the central processor. A record type region 1010, corresponding to bits 2-6, identifies the type of record. For branch instructions, a branch ("B") region 1018, corresponding to bit 7, provides an indicator as to whether a branch has been taken. A region 1015, corresponding to bits 8-18, is unused. A tag region 1020, corresponding to bit 19, is defined as "any absolute", where a value of one indicates an absolute address of a load/store unit (LSU) any non-system area, and a value of one indicates a LSU of the system area. A nonzero bit area 1025 includes a nonzero value corresponding to bit 20. An address region 1030, corresponding to bits 21-63, provides the source operand address information. It should be noted that in other examples, the SRCOP 1000 may have a different structure than that depicted in the above example.

Figure 11:
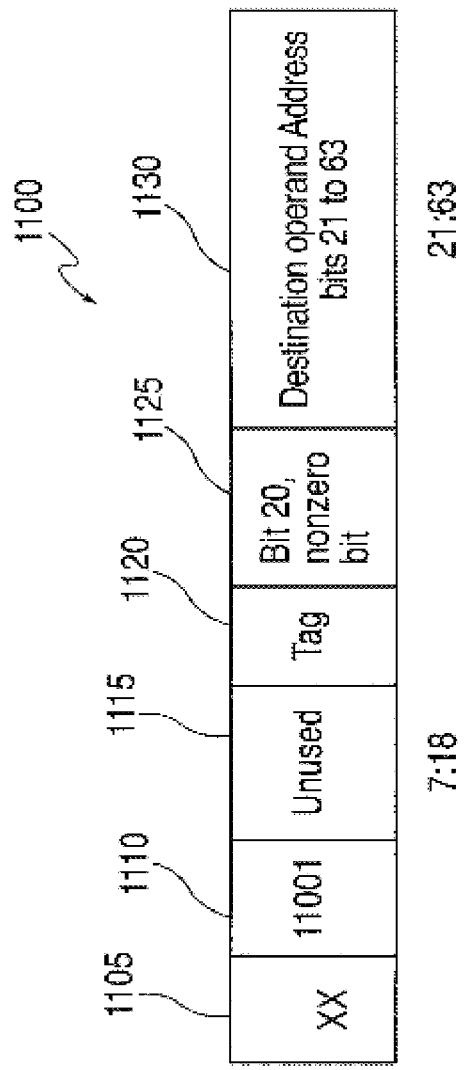
FIG. 11 illustrates an example destination operand (DSTOP) record, according to one or more embodiments of the present invention.

Referring to FIG. 11, the destination operand (system area) record 1100 (DSTOP) is shown according to one or more embodiments of the present invention. In one embodiment, the destination operand (system area) record 1100 includes a plurality of regions 1105-1130. An ID region 1105, corresponding to bits 0-1 identifies the central processor. A record type region 1110, corresponding to bits identifies the type of record. A region 1115, corresponding to bits 7-18, is unused. A. tag region 1120, corresponding to bit 19, is defined as "any absolute", where a value of one indicates an absolute address of a load/store unit (LSU) any non-system area, and a value of one indicates a LSU of the system area. A nonzero hit area 1125 includes a nonzero value corresponding to bit 20. An address region 1130, corresponding to bits 21-63, provides the destination operand address information. It should be noted that in other examples, the DSTOP 1100 may have a different structure than that depicted in the above example.

Thus, the technical solutions herein facilitate a processor to improve capturing IMT. IMT is a hardware-generated trace containing detailed information about the instructions executed by a processor core, such as the z Systems® core. IMT is used to drive performance models or simulation models that help predict and verify the performance of future systems. IMT can provide trace for multiple tier and multiple partition benchmarks which cannot be simulated with an IMT testing system, such as proprietary internal system. By implementing the technical solutions described herein, the captured IMT is improved and provides register contents and referenced memory data which are required to drive sequence testcases.

In an ideal scenario, IMT capture is stopped at every break point and started again by capturing initial contents of architected registers. However, such an IMT capture is costly to implement because it requires hardware to monitor/decode instruction to identify potential instruction(s) causing breakpoint(s). The technical solutions described herein address such a technical problem by capturing the initial contents of architected registers on every K number of instructions. In this way, if a breakpoint is identified in the IMT during parsing the IMT, generating a testcase can be stopped and a next testcase can be started at a next point in the IMT that provides a snapshot of the architectural registers.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:
1. A computer-implemented method comprising:
   initiating an in-memory trace (IMT) data capture for a processor, the IMT data being an instruction trace collected while instructions flow through an execution pipeline of the processor;

capturing contents of architected registers by:
  storing the contents of architected registers to a predetermined memory location; and
  causing a load-store unit (LSU) to read contents of the predetermined memory location; and
prior to capturing the IMT data, verifying IMT data records by generating a pseudo IMT capture using a first AVP file;
generating a second AVP file using the pseudo IMT; and
comparing the first AVP file and the second AVP file.

2. The computer-implemented method of claim 1, wherein causing the LSU to read the contents of the predetermined memory location comprises: generating a memory fetch control record and a memory fetch data record in the IMT data capture.

3. The computer-implemented method of claim 1, wherein the contents of the architected registers are captured in response to a breakpoint.

4. The computer-implemented method of claim 1, wherein the contents of architected registers are captured in response to the IMT data capture being initialized in extended-IMT mode.

5. The computer-implemented method of claim 4, wherein the IMT data capture includes values of operands of the instructions.

6. The computer-implemented method of claim 5, wherein a value of an operand is captured using a memory fetch control record and a memory fetch data record, and an address of the operand is captured using a source operand record or a destination operand record.

7. The computer-implemented method of claim 2, wherein a structure of the memory fetch control record is based on a type of the processor.

8. The computer-implemented method of claim 1, wherein the contents of the architected registers are captured after every predetermined number of instructions are executed by the processor.

9. The computer-implemented method of claim 1, the processor being a first processor, and the method further comprising:
  executing, using a second processor, the instruction traced by the first processor using the IMT capture data by accessing the contents of architected registers from the IMT capture data.

10. The computer-implemented method of claim 1, further comprising:
  executing, using a simulated processor, the instruction traced by the processor using the IMT capture data by accessing the contents of architected registers from the IMT capture data.

11. A computer-implemented method for testing a processor, the method comprising:
  initiating an in-memory trace (IMT) data capture for a processor, the IMT data being an instruction trace collected while instructions flow through an execution pipeline of the processor;
  in response to the IMT data capture initiated in an extended mode, capturing contents of architected registers of the processor in the IMT data by:
    storing the contents of the architected registers to a predetermined memory location; and
    causing a load-store unit (LSU) to read contents of the predetermined memory location; and
  prior to capturing the IMT data, verifying IMT data records by generating a pseudo IMT capture using a first AVP file;
  generating a second AVP file using the pseudo IMT; and
  comparing the first AVP file and the second AVP file.

12. The computer-implemented method of claim 11, further comprising:
  generating a test sequence using the capture IMT data, the test sequence including the instruction, the contents of the architected registers, and operand data from the captured IMT data; and
  executing the test sequence using a second processor.

* * * * *